US011195477B2

(12) United States Patent
Nicholson et al.

(10) Patent No.: US 11,195,477 B2
(45) Date of Patent: Dec. 7, 2021

(54) ADJUSTMENT OF PIXEL DRIVE STRENGTH WITHIN AN AUGMENTED REALITY SCENE

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/836,326

(22) Filed: Mar. 31, 2020

(65) Prior Publication Data
US 2021/0304685 A1 Sep. 30, 2021

(51) Int. Cl.
G09G 3/34 (2006.01)
G06T 19/00 (2011.01)
G06F 3/01 (2006.01)
G02B 27/01 (2006.01)

(52) U.S. Cl.
CPC ........... *G09G 3/3413* (2013.01); *G06F 3/013* (2013.01); *G06T 19/006* (2013.01); *G02B 27/017* (2013.01); *G09G 2320/0626* (2013.01); *G09G 2320/0653* (2013.01); *G09G 2330/023* (2013.01)

(58) Field of Classification Search
CPC .............. G02B 27/017; G02B 27/0172; G02B 2027/0138; G02B 2027/014; G02B 2027/0178; G02B 2027/0187; G06F 3/011; G06F 3/017; G06F 3/147; G06T 19/006; G09G 5/18; G09G 2340/0464; G09G 2340/125; G09G 2354/00; G09G 2360/144
See application file for complete search history.

(56) References Cited

U.S. PATENT DOCUMENTS 10,139,902 B2 * 11/2018 Inomata ................... G06F 3/012
10,389,996 B1 * 8/2019 Mercier ................ H04N 13/128
2016/0161744 A1 * 6/2016 Kobayashi ......... G02B 27/0172
345/8

* cited by examiner

*Primary Examiner* — Nelson M Rosario
(74) *Attorney, Agent, or Firm* — Ference & Associates LLC (57) ABSTRACT

One embodiment provides a method, including: producing, using one or more optical engines of an augmented reality display, an augmented reality scene; identifying, based upon a location of a gaze of a user, at least one object the user is viewing; and adjusting, based upon the identification of the at least one object, a drive strength of one or more pixels associated with at least one virtual object on the augmented reality display. Other aspects are described and claimed.

18 Claims, 3 Drawing Sheets

ADJUSTMENT OF PIXEL DRIVE STRENGTH WITHIN AN AUGMENTED REALITY SCENE

BACKGROUND

Power consumption and overheating has been a reoccurring issue with technology devices. Devices can be designed to perform revolutionary tasks. However, if a system overheats, a system will crash. Over time some strategies have become common to keep a system from overheating. For example, the implementation of device fans, heat pipes, and other cooling solutions now permit the use of a device for extended periods of time, while maintaining a desirable internal temperature that does not cause components within the device to overheat. However, with new technology come new issues to overcome. Augmented reality (AR) is a new technology that is now being implemented into a wide variety of systems. However, AR systems require large amounts of power due to the requirement to generate and render displays in real-time. A result of this power use is both heat and an increase in device size for accommodating components to cool the device.

BRIEF SUMMARY

In summary, one aspect provides a method, comprising: producing, using one or more optical engines of an augmented reality display, an augmented reality scene; identifying, based upon a location of a gaze of a user, at least one object the user is viewing; and adjusting, based upon the identification of the at least one object, a drive strength of one or more pixels associated with at least one virtual object on the augmented reality display.

Another aspect provides an information handling device, comprising: one or more optical engines of an augmented reality display; at least one processor; a memory device that stores instructions executable by the processor to: produce, using one or more optical engines of an augmented reality display, an augmented reality scene; identify, based upon a location of a gaze of a user, at least one object the user is viewing; and adjust, based upon the identification of the at least one object, a drive strength of one or more pixels associated with at least one virtual object on the augmented reality display.

A further aspect provides a product, comprising: a storage device that stores code, the code being executable by a processor and comprising: code that produces, using one or more optical engines of an augmented reality display, an augmented reality scene; code that identifies, based upon a location of a gaze of a user, at least one object the user is viewing; and code that adjusts, based upon identification of the at least one object, a drive strength of one or more pixels associated with at least one virtual object on the augmented reality display The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Augmented reality is a new technology that requires additional, non-traditional components that utilize power which produces heat. The use of at least one optical engine and logic chip, along with the power the system needs to run the AR device causes a device to consume power and produce heat. Continued use of a system without proper ventilation or cooling can result in overheating, potential damage to the system. Additionally, while the components are operating, the components consume power, which is usually provided in the form of a battery. Thus, the battery life of the device is limited by the number of components that are powered. Additionally, due to the nature of augmented reality systems, the power-consuming heat-producing components are traditionally placed within a headset that is worn on the face of a user, for example, as a head mounted display (HMD). Thus, it is even more important to reduce the power utilized by the system in order to reduce the heat produced by the system to a temperature that will not cause burns or damage to the user, for example, burning a user's face while utilizing a HMD. Additionally, because the device is traditionally worn on a user's face, the preference is to have a less bulky device. However, the device still needs the necessary components for operation. Accordingly, the device needs to be efficient in order to maximize battery life and minimize size and weight.

In an attempt to overcome overheating issues with an AR device, spacing between components may be increased to promote ventilation, thereby increasing the natural cooling capabilities of the device. However, due to the different components needed to properly create an augmented reality scene and therefore, device, conventional AR devices are already large and potentially uneven. Thus, increasing the spacing between components to promote ventilation can lead to an even more uneven and unwieldy wearable device, that is uncomfortable for a user to wear. One possible technique for decreasing the overall size and heat production of the wearable device is to attempt to decrease the size of the optical engine, logic chip, or battery included in the AR device. However, decreasing the size of an element can result in the lesser quality display. Another technique has been to move some of the components to a secondary location, for example, a pack that is worn by the user at the waist. However, not all the components can be moved from the display, for example, the component producing the most heat, the optical engines, cannot be moved from the display. Thus, there is still a need and desire to decrease heat produced by the system.

Additionally, since an augmented reality device requires multiple components to operate and the system draws a substantial amount of power, the battery life of an augmented reality system can be relatively short. Producing an augmented reality scene requires the system to produce multiple virtual objects on a display. The more virtual items that need to be produced and maintained by a system, the more power must be consumed. This results in faster drain on the battery. Thus, a technique that reduces the amount of power drawn by the system is desirable. This would have the additional effect of reducing the amount of power produced by the system.

Accordingly, the described system and method provides a technique for more efficiently powering a wearable augmented reality device to reduce output heat, decrease device size, and increase battery life of a device. Throughout this application reference to AR glasses will be used for ease of readability; however, this is a non-limiting example. The systems and methods described throughout this application may be used for any type of AR, virtual reality (VR), mixed reality (MR), extended reality (ER), or the like, devices or devices that can produce AR, VR, MR, ER, or the like. Additionally, for ease of readability, the discussion will be directed toward AR devices and scenes. However, it should be understood that the described systems and methods can apply to any device that can produce fully virtual or partially virtual scenes, for example, AR devices, VR devices, and the like. For example, the described system may apply to a smartphone or other mobile devices that can run an AR or VR application. Additionally, devices that produce fully virtual scenes, known as virtual reality devices, may also utilize the described power saving techniques.

A system may use multiple optical engines to render a virtual object on a display. Rendering the virtual object may require significant power, thus generating heat when the optical engines are in use. A system may utilize gaze tracking techniques to determine when a rendered virtual image is being viewed or not. At an instance when a virtual is being viewed the virtual object may be fully rendered by the system. However, at an instance when a virtual is not being viewed, the system may only partially render the virtual object by reducing the drive strength of pixels associated with the virtual object. Reducing the drive strength of a pixel refers to reducing the amount of power that is being used to drive the pixel, which results in a pixel that appears dimmer to a user. The pixel drive strength can be reduced to zero, which results in the pixel not being rendered at all. By determining what objects are being viewed in a scene prompts the adjustment of luminance or brightness within the AR scene on the device. By varying the luminance of pixels on the display, the power needed by the system can be reduced which reduces heat production and extends battery life.

The illustrated example embodiments will be best understood by reference to the figures. The following description is intended only by way of example, and simply illustrates certain example embodiments.

Figure 1:
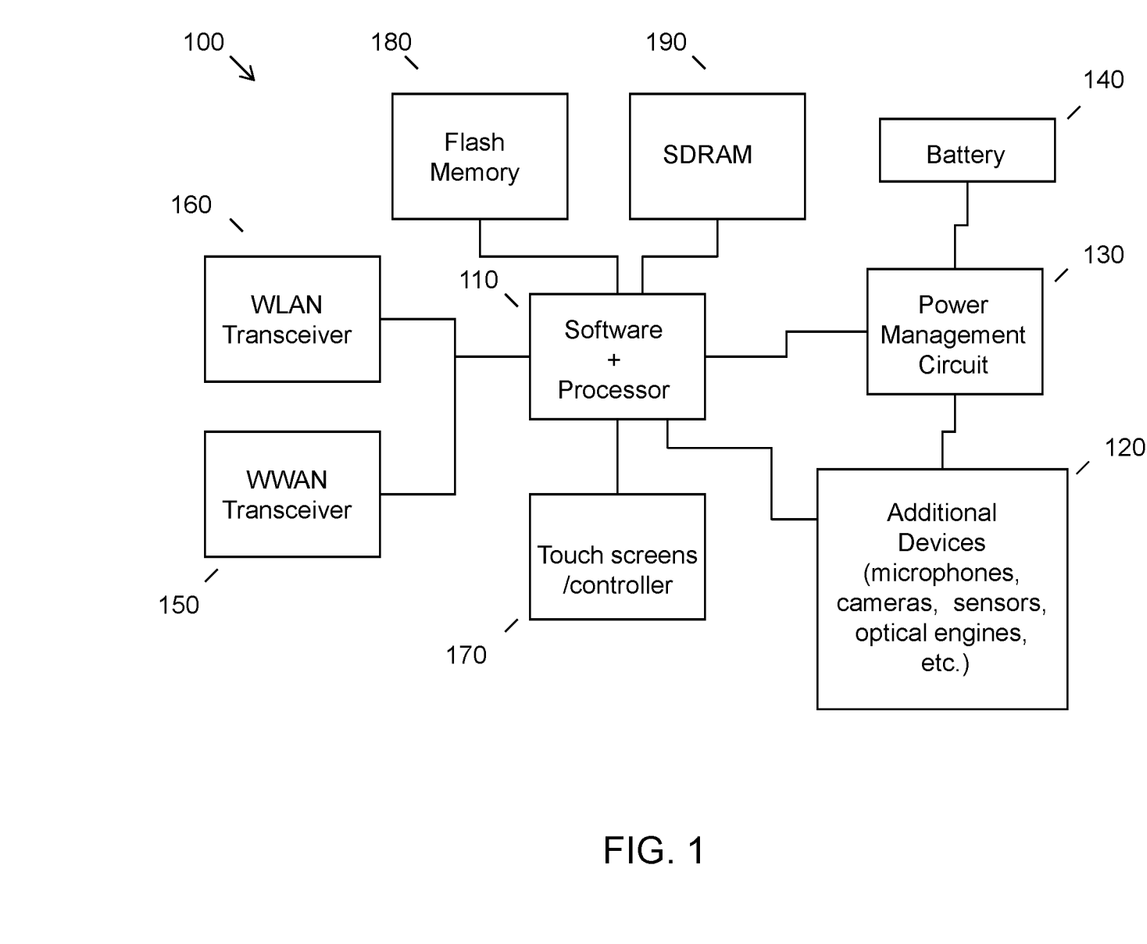
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, sensors for tracking head movement, hand gestures, eye tracking, user positions, optical engines, etc. System 100 often includes one or more touch screens 170 for data input and display/rendering. System 100 also typically includes various memory devices, for example flash memory 180 and SDRAM 190.

Figure 2:
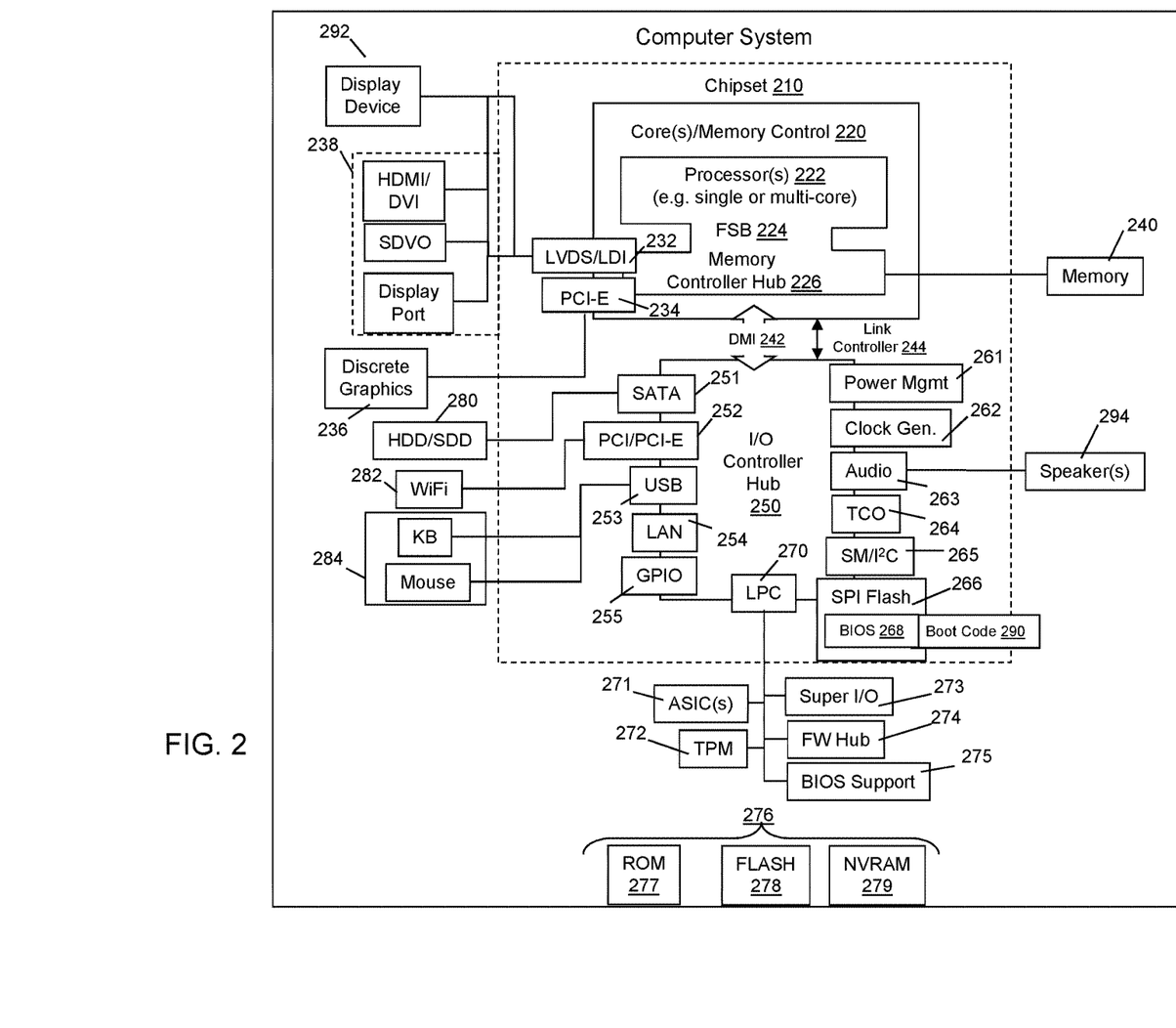
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that may be capable of generating, rendering, or displaying augmented or virtual reality scenes. For example, the circuitry outlined in FIG. 1 may be implemented in a smart phone or tablet embodiment or an augmented reality glasses environment, whereas the circuitry outlined in FIG. 2 may be implemented in a laptop or augmented reality system or headset.

Figure 3:
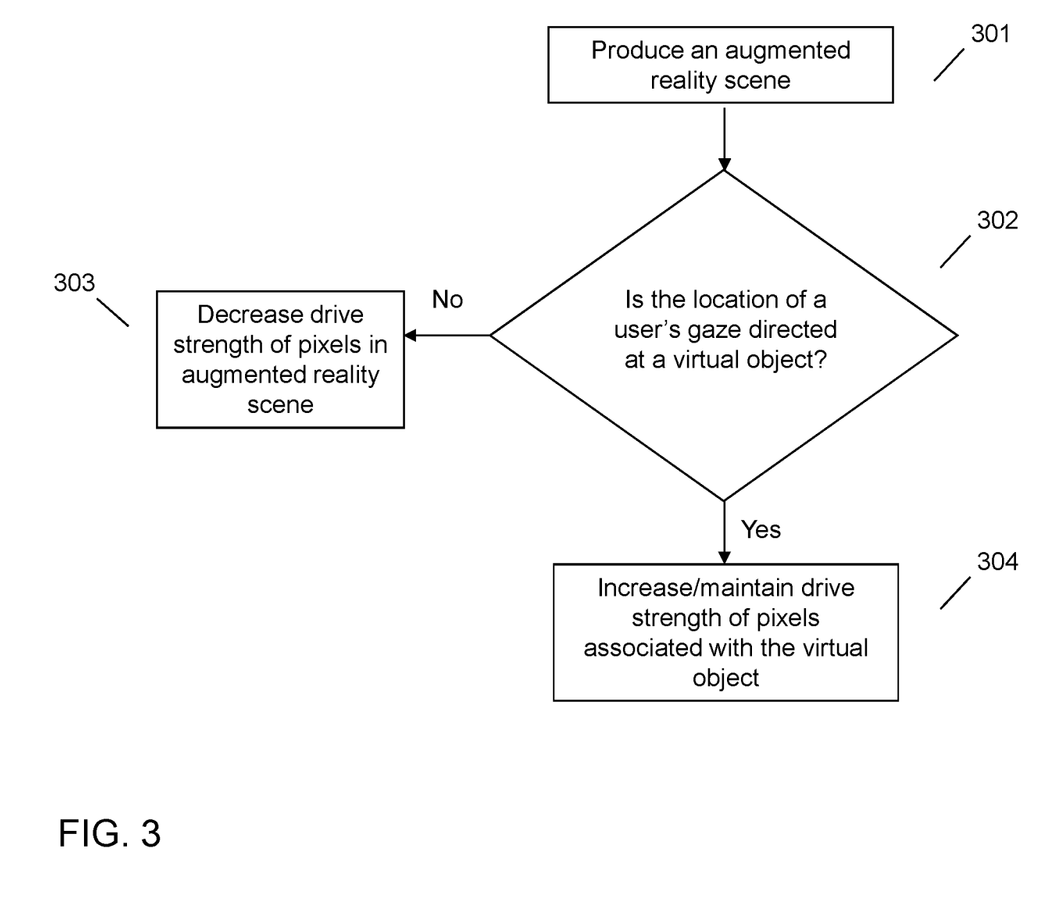
FIG. 3 illustrates an example method of adjusting pixel drive strength associated with a virtual object to reduce power consumption in an augmented reality device.

Referring now to FIG. 3, a method for reducing the power consumption and device heating utilizing user gaze tracking and adjusting pixel illumination is provided. In an augmented reality device, the device may consume the most power, and therefore, produce the most heat when generating, rendering, and displaying the virtual objects in the augmented reality scene. The display requires power for illumination, the optical engines require power to process, generate, and render a scene, and sensors require power to determine different characteristics of a user and a user's position in order to accurately render the scene. Additionally, maintaining an AR scene requires a consistent amount of power for an extended length of time, specifically, almost, if not all, the whole time that the system and corresponding display are powered. Thus, the power source within the system needs to be sufficient for providing the amount of power required by the system.

Rather than the augmented reality device maintaining maximum luminance or illumination across the entirety of the AR scene or display, the described system and method may dynamically adjust the drive strength of pixels within an augmented reality scene. The drive strength refers to the current or voltage consumed by a pixel. By dynamically adjusting the drive strength of the pixels, thus adjusting the luminance of the pixels, a system may conserve power and decrease the heat of system. This has the added benefit of requiring smaller components, for example, batteries, cooling components, and the like, which may then reduce the overall size of the AR device. Additionally, with the smaller components, smaller cooling solutions are possible, thereby decreasing the overall size of the device or system.

At 301, a system may produce an augmented reality scene for an AR device, for example, AR glasses, an AR headset, a portable information handling device that produces AR scenes, or the like. As stated above, the example of AR glasses will be used here throughout to increase readability, but the described system and method is not limited to AR glasses. An augmented reality scene may include virtual content overlaid on physical content. For example, a person may be in a room that is viewable on the AR scene, but objects that appear in the AR scene may be virtual objects, or those rendered by the AR system. An AR scene is generally recognized as a combination of physical or real objects and virtual or rendered objects combined into a single scene.

One or more optical engines may be used to produce an AR scene, and in doing so an optical engine may act as a light source and provide luminance to the display within the AR system. The optical engines used in a system may be optical engines for use in an emissive type configuration. For example, the system may utilize a liquid crystal display (LCD), or other configurations where the display provides the illumination for the system. Generally, an AR device includes two optical engines, one for each eye of a user. However, the described system and method can be utilized with a single optical engine or more than two optical engines. Each of the optical engines may produce zones or segments of luminance. These zones may include multiple pixels that are illuminated or powered to light up the necessary portions of a rendered display of virtual objects. Utilizing the multiple zones, the system can control which zones are illuminated, thereby controlling the virtual objects that are illuminated. Accordingly, each zone of the optical engine may be controlled independently from other zones produced by the optical engines.

After rendering an augmented reality scene on the AR display, a system may determine whether a virtual object within the AR scene is located at the location of a user's gaze at 302. To make this determination the system may determine the location of a user's gaze within the augmented reality scene. In determining the location of a user's gaze a system may track the eye position of the user. Tracking the eye position of the user may be done with the use of sensors operatively coupled to the AR glasses system, for example, cameras, eye tracking sensors, or the like. Sensors may continually track a user's eye position while a system is in use, which may provide a system with information in determining a location of a user's gaze. In an embodiment, at least one sensor detecting a user's gaze and eye position may be integrally coupled to an augmented reality device. It should be understood that the sensors do not have to be a direct component of the AR system, but may also be sensors accessible by the AR system. For example, the AR system may access cameras within a room where the AR system is being utilized. Alternatively or additionally, the sensors may be located on the AR system, for example, within or on the AR glasses or headset.

Once the location of the user's gaze is determined, the system can determine whether a virtual object of the AR scene is at the location of the user's gaze. To identify the object, or even determine if the user is looking at a virtual object, the system may identify the location, for example, coordinates, of the user's gaze on the display. The system may then correlate this location with the augmented reality scene rendering. Since the system knows what is being rendered and where objects on the display are being rendered, the system can correlate the location of the user's gaze on the display with the rendering map of the augmented reality scene. Once this correlation is made the system can identify what object is currently being rendered at that display location, thus identifying the object the user is viewing. Identifying the object of the user's gaze allows for identifying whether the user is viewing a virtual or physical object. Based upon identification of the object, specifically, whether the object is a virtual or physical object, the system can dynamically modify the luminance of the system. More specifically, a system can dynamically modify the drive strength of the pixels associated with the at least one virtual object being viewed or not.

For example, a system may determine that a user is viewing a virtual object in the augmented reality scene. A system may track the user's eye position and further determine a user's gaze, and from the location of the user's gaze a system may conclude that the user is viewing a virtual object in the augmented reality scene. Similarly, a system may determine that a user is viewing a physical object in the augmented reality scene. A system may track the user's eye position and further determine a user's gaze, and from the location of the user's gaze a system may conclude that the user is viewing a physical object in the augmented reality scene.

Based upon the object being viewed by the user in the augmented reality scene, a system may adjust the drive strength of one or more pixels associated with at least one virtual object in a scene, based upon whether it is being viewed. For example, if there is a virtual object at the location of the user's gaze in the augmented reality scene, the drive strength of the pixels associated with the virtual object may be increased, for example, to the maximum value at 304. If the drive strength is already at the maximum value, the system may simply maintain this drive strength. In other words, if a user is viewing a virtual object, the system may render and display the virtual object as under normal operating conditions.

It should be noted that a maximum drive strength value may not be the maximum value possible. Rather, it may be a system maximum value as set by the system or a user. For example, a user may want the display to be illuminated at a particular brightness or drive strength. Thus, this value may be set as the maximum value. In other words, when a virtual object is being viewed, the pixels are producing as much luminance as predetermined by the system, allowing for a clear view of the virtual object. The continued viewing of the virtual object will maintain the drive strength of the pixels for the period in which the virtual object is being viewed. In an embodiment, based upon the amount of remaining battery life, the maximum capacitance of the one or more pixels associated with the virtual image may decrease to assist in the potential longevity of use of the AR device.

If, on the other hand, the location of the user's gaze does not correlate or corresponding to a virtual object, the system may decrease the drive strength of the pixels associated with the virtual object(s) present in the augmented reality display at 303. The drive strength of a pixel is the amount of power (e.g., current, voltage, etc.) a pixel is consuming at an instance in time. The drive strength of a pixel correlates to the luminance or brightness of the pixel within the display. In other words, the drive strength of a pixel corresponds to how bright a virtual object appears or a value of luminance associated with a pixel of the virtual object. By decreasing the drive strength of the one or more pixels associated with a virtual object not being viewed, the amount of power consumed by the system at that instance will decrease, the overall power consumed will decrease and, thus, the amount of heat being produced by a device will be decreased and the battery life will be increased.

In an embodiment if there are multiple virtual objects within the augmented reality scene, a system may decrease the drive strength of the pixels of the virtual object(s) not being viewed, even if another of the virtual objects is being viewed. In an embodiment, an AR scene may include two virtual objects that are being viewed together at a particular location, for example, a virtual salt shaker and a virtual pepper shaker. In this example, the drive strength of the pixels associated with both the virtual salt shaker and the virtual pepper shaker may be operating at the maximum drive strength value. In an example having at least two virtual objects in the augmented reality scene that are not being viewed at the same time, the drive strength of the pixels associated with the virtual object not being viewed may decrease. For example, if a virtual television is on one side of the rendered AR scene and a virtual globe is present on the opposite side of the AR scene, and the user's gaze is directed toward the television, the drive strength of the pixels associated with the virtual globe may decrease, and vice versa.

In an embodiment, decreasing the drive strength of the pixels corresponding to at least one virtual object within an AR scene when not being viewed may include powering down all the pixels associated with the virtual object. After determining that the user is not viewing a virtual object, the drive strength of the pixels may decrease to a zero. This results in the virtual object no longer being viewable in the rendered AR scene. When the drive strength of a pixel is zero, the pixel is completely transparent. Alternatively, instead of decreasing the drive strength value all the way to zero, the drive strength of the pixels associated with a virtual object may simply be reduced, not all the way to zero. In this example, the virtual object will have a level of opaqueness, which still allows for the virtual object to be viewable within the AR scene. Having the virtual object appear opaque may permit a user to locate the virtual object and then view the virtual object, which would cause the drive strength of the pixels of the now-viewed virtual object to be returned to maximum value.

In an embodiment, adjusting the drive strength of one or more pixels may include powering down or reducing the drive strength value of interior pixels of at least one virtual object not being viewed. The system will then maintain the drive strength value for one or more pixels corresponding to the outline of the virtual object not being viewed. The system may also reduce the drive strength of the outline pixels, but not as much as with the interior pixels. In this embodiment, the drive strength associated with the interior pixels of the at least one virtual object not being viewed may be set to zero and provide complete transparency or may, alternatively, be set to a value above zero and provide a level of opaqueness with the interior of the virtual object. However, the pixels associated with the edge or outline of the virtual object not being viewed may be a drive strength value that allows for locating the virtual object. This may assist a user in locating the virtual object to be viewed, while still decreasing power consumption of the system.

In an embodiment, when adjusting the drive strength of the one or more pixels, a system may adjust the drive strength of alternating pixels. Adjusting the drive strength of every other pixel of a virtual object may decrease the amount of power needed to render the virtual object. This results in rather than every pixel operating at maximum drive strength value, alternating pixels may be at a lesser drive strength value than the other half of the pixels which may be operating at full drive strength value or a reduced drive strength value that is greater than the drive strength value of the other half of pixels. This technique results in a virtual image that may still be clearly viewable on an augmented reality scene. In an embodiment, the drive strength of alternating pixels for a virtual object not being viewed by a user may further promote the conservation of energy within a system.

In an embodiment, adjusting the drive strength of one or more pixels associated with a virtual object comprises adjusting the drive strength of a predetermined number of pixels of the virtual object. In other words, a virtual object may include a predetermined amount of pixels that are adjusted when the drive strength of a pixel is instructed to change. For example, based upon the size of the rendered virtual object, a system may predetermine that by illuminating every four pixels, the virtual object is still clear or clear enough to be distinguishable. Thus, the system may select every fourth pixel as being illuminated at the maximum drive strength value or at least a drive strength value greater than the remaining pixels. The remaining pixels are then illuminated at a lower drive strength value, which may be zero. This technique results in a quarter of the overall pixels associated with the virtual image requiring more power than the remaining pixels. Thus, power is conserved over the traditional technique of illuminating all pixels associated with the virtual object at maximum drive strength.

In an embodiment, adjusting the drive strength of the one or more pixels associated with a virtual object may include tracking a length of time that a user does not view the virtual image. Based upon the length of time that since a viewer has last viewed the virtual object, the drive strength of the pixels may gradually decrease. After a system determines that a user is not viewing a virtual object in the augmented reality scene, the system may begin to record the length of time a user goes without viewing the virtual object. Based upon the length of time since a user last viewed the virtual object, a drive strength value adjustment of the pixels corresponding to the virtual object may be implemented. For example, the drive strength value of the pixels corresponding to a virtual object in the AR scene that has not be viewed in ten minutes may be less than the drive strength value of the pixels corresponding to a virtual object in the AR scene that has not been viewed in five minutes. On the other hand, the drive strength value of the pixels corresponding to the virtual object that has not been viewed for ten minutes may be greater than a drive strength value of the pixels corresponding to the virtual object that has not been viewed for thirty minutes. While in one embodiment the drive strength value may eventually reach zero, in another embodiment the drive strength value may not reach zero in order to provide a level of opaqueness for the pixels associated with a virtual object.

The example described above discusses reducing the drive strength value for all the pixels. However, the drive strength adjustment technique may vary over time, for example, at one point in time the drive strength value of the pixels of the entire virtual object are reduced while at another period the drive strength value of different pixels are adjusted. Additionally, the reduction in drive strength may not be linear. For example, a reduction at ten minutes may be a reduction of a predetermined value, whereas a reduction at twenty minutes may be a reduction of three times the predetermined value.

During use of a system, a user may switch between objects within the augmented reality scene. This includes going from viewing a physical object to a virtual object, viewing a virtual object and then a different virtual object, viewing a virtual object and then a physical object, and the like. Moving between the objects being viewed may alter the drive strength of the pixels associated with a virtual object, as mentioned previously. In an embodiment, when a user is transitioning between viewing virtual objects in a scene or viewing a virtual object after viewing a physical object, a system may readjust the drive strength of the one or more pixels of the virtual object responsive to detecting the gaze of the user returning to the virtual object.

The drive strength associated with the virtual object being viewed may remain constant during all occurrences when viewing the specific virtual object. For example, if the user is viewing a first virtual image that currently has a pixel drive strength maximum value and switches to a second virtual object, the first virtual object may change to pixel strength values that results in illumination of alternating pixels. When the user goes back to viewing the first virtual object, the drive strength of the pixels of the first virtual object readjusts from the decreased drive strength value corresponding to the drive strength values when not being viewed back to maximum capacitance corresponding to the drive strength values associated with viewing the virtual object.

By decreasing the drive strength of the pixels associated with virtual objects not being viewed by a user of the AR wearable device, a system may conserve energy. The conservation of energy increases battery life and longevity of use, and also decreases the heat generated by a system. The improvements described throughout this specification may permit the use of smaller components because of the ability to efficiently power a system and reduce the amount of cooling components or spacing required in the system. The reduction in the size of the components decreases the overall size of the device and provides a more sturdy augmented reality device. In combination with decreasing the drive strength of the pixels for a virtual object, a system may utilize pixel portioning techniques to decrease the amount the power used when not viewing a virtual object. Additionally or alternatively, in an embodiment, the pixel portioning techniques may be used independently of the drive strength techniques previously discussed.

The various embodiments described herein thus represent a technical improvement to conventional methods of powering an augmented reality display by efficiently powering a system to increase device use longevity, and decrease the heat produced by an augmented reality device. Rather than continuously running an augmented reality device at maximum pixel drive strength values, a system may detect the object a user is viewing based upon the user's detected gaze, and adjust the drive strength of the pixels associated with a virtual object that is rendered in the augmented reality scene but not currently being viewed by the user. Adjusting the drive strength of pixels within a scene may adjust the total illuminance rendered on the display of the augmented reality device. Adjusting the luminance based on the object being viewed may keep a system running for an extended period of time and may avoid a system from overheating. Additionally, smaller components can be utilized, thereby reducing the overall size of the AR system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    producing, using one or more optical engines of an augmented reality display, an augmented reality scene;
    identifying, based upon a location of a gaze of a user, at least one object the user is viewing, wherein the identifying comprises correlating the location of the gaze with a location within the augmented reality scene and identifying the at least one object at the location within the augmented reality scene; and
    adjusting, based upon the identification of the at least one object, a drive strength of one or more pixels associated with at least one virtual object on the augmented reality display, wherein the adjusting comprises decreasing the drive strength of the one or more pixels of the at least one virtual object responsive to determining, based upon the identifying, the user is not viewing the at least one virtual object while maintaining a drive strength of one or more pixels of the at least one object the user is viewing within the augmented reality scene.

2. The method of claim 1, wherein adjusting the drive strength of one or more pixels comprises powering down one or more pixels of the at least one virtual object when not being viewed on the augmented reality scene.

3. The method of claim 1, wherein the adjusting the drive strength of the one or more pixels comprises powering down interior pixels of the at least one virtual object when not being viewed and maintaining power for one or more pixels corresponding to an outline of the at least one virtual object.

4. The method of claim 1, wherein the adjusting the drive strength of the one or more pixels comprises tracking a time since the user last viewed the at least one virtual object; and
    adjusting, as the time increases, a number of pixels corresponding to the at least one virtual object whose drive strength is adjusted.

5. The method of claim 1, wherein the adjusting the drive strength of the one or more pixels comprises adjusting the drive strength of alternating pixels of the at least one virtual object.

6. The method of claim 1, wherein the adjusting the drive strength of the one or more pixels comprises adjusting the drive strength of a predetermined of number of pixels of the at least one virtual object.

7. The method of claim 1, wherein the adjusting the drive strength of the one or more pixels comprises reducing the drive strength of the one or more pixels to a value above zero.

8. The method of claim 1, comprising readjusting the drive strength of the one or pixels responsive to detecting the gaze of the user returning to the at least one virtual object.

9. The method of claim 1, wherein the augmented reality display comprises a display where pixels within the display provide illuminance for the display.

10. An information handling device, comprising:
one or more optical engines of an augmented reality display;
at least one processor;
a memory device that stores instructions executable by the processor to:
produce, using one or more optical engines of an augmented reality display, an augmented reality scene;
identify, based upon a location of a gaze of a user, at least one object the user is viewing, wherein to identify comprises correlating the location of the gaze with a location within the augmented reality scene and identifying the at least one object at the location within the augmented reality scene; and
adjust, based upon the identification of the at least one object, a drive strength of one or more pixels associated with at least one virtual object on the augmented reality display, wherein the adjusting comprises decreasing the drive strength of the one or more pixels of the at least one virtual object responsive to determining, based upon the identifying, the user is not viewing the at least one virtual object while maintaining a drive strength of one or more pixels of the at least one object the user is viewing within the augmented reality scene.

11. The information handling device of claim 10, wherein to adjust the drive strength of one or more pixels comprises powering down one or more pixels of the at least one virtual object when not being viewed on the augmented reality scene.

12. The information handling device of claim 10, wherein to adjust the drive strength of the one or more pixels comprises powering down interior pixels of the at least one virtual object when not being viewed and maintaining power for one or more pixels corresponding to an outline of the at least one virtual object.

13. The information handling device of claim 10, wherein to adjust the drive strength of the one or more pixels comprises tracking a time since the user last viewed the at least one virtual object; and adjusting, as the time increases, a number of pixels corresponding to the at least one virtual object whose drive strength is adjusted.

14. The information handling device of claim 10, wherein to adjust the drive strength of the one or more pixels comprises adjusting the drive strength of alternating pixels of the at least one virtual object.

15. The information handling device of claim 10, wherein to adjust the drive strength of the one or more pixels comprises adjusting the drive strength of a predetermined of number of pixels of the at least one virtual object.

16. The information handling device of claim 10, wherein to adjust the drive strength of the one or more pixels comprises reducing the drive strength of the one or more pixels to a value above zero.

17. The information handling device of claim 10, comprising to readjust the drive strength of the one or pixels responsive to detecting the gaze of the user returning to the at least one virtual object.

18. A product, comprising:
a storage device that stores code, the code being executable by a processor and comprising:
code that produces, using one or more optical engines of an augmented reality display, an augmented reality scene;
code that identifies, based upon a location of a gaze of a user, at least one object the user is viewing, wherein the code that identifies comprises correlating the location of the gaze with a location within the augmented reality scene and identifying the at least one object at the location within the augmented reality scene; and
code that adjusts, based upon identification of the at least one object, a drive strength of one or more pixels associated with at least one virtual object on the augmented reality display, wherein the code that adjusts comprises decreasing the drive strength of the one or more pixels of the at least one virtual object responsive to determining, based upon the identifying, the user is not viewing the at least one virtual object while maintaining a drive strength of one or more pixels of the at least one object the user is viewing within the augmented reality scene.

* * * * *